Patented Nov. 28, 1944

2,364,015

UNITED STATES PATENT OFFICE 2,364,015

SILICATE COMPOSITIONS

Charles C. Winding, Ithaca, N. Y., assignor to Tide Water Associated Oil Company, Bayonne, N. J., a corporation of Delaware No Drawing. Application January 10, 1942, Serial No. 426,287

5 Claims. (Cl. 23—110)

This invention relates to synthetic silicate compositions, methods of preparing the same and their use in the arts. In general aspect, the invention is concerned with synthetic magnesium silicate compositions having adsorbent properties and particularly those having utility in the removal of color or other impurities from liquids capable of being decolorized or otherwise refined by active adsorbent compositions. In more specific aspect the invention is directed to magnesium silicate compositions effective in the decolorization of oils, as, for example, petroleum lubricating oils.

Solid adsorbent compositions, both of natural and synthetic origin, are used extensively in the removal of coloring matter or othewise refining liquids and solutions. The treatment of petroleum fractions, especially viscous oils of lubricating character, is an important illustrative example of the use of adsorbents for the removal of undesired components or constituents.

Two distinct methods of refining liquids, such for example as lubricating oils, with solid adsorbent compositions are in general use. One of these is the procedure commonly designated as contact treatment, and the other is usually identified as percolation. The two operations differ radically in manipulative detail, each predicated upon and requiring a distinct type and form of adsorbent material.

In contact treatment, the adsorbent must be very finely divided, for example 200 to 300 mesh, and hardness or resistance to attrition is not a consideration. Such contact decolorizing material is agitated in a body of oil at elevated temperature for sufficient time to obtain the desired degree of refining, after which the decolorized oil is separated from the spent adsorbent, usually by filtration.

The percolation method requires a relatively coarse, granular adsorbent material and the percolant particles must have hardness to a degree at least sufficient to withstand breakdown or attrition loss in handling operations. In decolorizing oils by percolation treatment, a deep static bed of adsorbent material is provided through which the oil filters or percolates. When, by reason of adsorbing coloring matter from the oil, the adsorbent material shows diminished activity, oil flow is cut off. After draining and steaming in situ the adsorbent may be removed by a suitable conveyor system to a furnace, such as the familiar multiple hearth, rabble-arm type, and revivified by burning.

Thus, it will be apparent that preparation of a synthetic adsorbent involves consideration of its contemplated use. Depending upon whether the adsorbent is to be used in contact treatment or in a percolation method, distinct and different properties or characteristics are required. A given adsorbent material cannot be used alternatively as a contact agent or a percolant. Adsorbent compositions having the form and properties necessary for contact use have no utility in percolation methods of refining, while adsorbent material in percolant form will not function satisfactorily as a contact agent.

The magnesium silicate adsorbent compositions of the present invention are of the percolant type, effective for decolorizing oils or other liquids by the percolation method. They are characterized by suitable form, hardness and other physical properties desired in percolant adsorbents and by high decolorizing power when used in percolant methods.

The magnesium silicate compositions of this invention are produced by a method involving provision or preparation of a suitable metal silicate materal having the hardness, form and other physical properties desired in percolant adsorbents, and then treating this material with an aqueous solution containing magnesium ions to replace metal ions of the metal silicate with magnesium ions by cation or base exchange reaction. An important feature of the invention resides in the fact that the desired physical properties of the magnesium silicate adsorbent composition produced by this method and the degree of adsorbent effectiveness obtainable therein depend upon and are predetermined by the physical structure and form of the metal silicate material from which it is prepared.

Metal silicate materials of suitable form and physical properties, and methods of preparing the same, are disclosed in my copending application Serial No. 419,109, filed November 14, 1941, now U. S. Patent 2,359,344 of which the present application is a continuation-in-part. They may comprise calcium-, barium- or strontium silicate or mixed silicates, for example calcium and magnesium silicates, or other metal silicate which by exchange reaction with magnesium salt solution is converted to an active magnesium silicate adsorbent composition. Preparation of these metal silicates involves controlled precipitation from aqueous solutions by reaction of a suitable soluble silicate such as an alkali metal silicate with a soluble salt of the metal desired in the precipitated silicate material, for example salts of calcium, barium, strontium or mixed calcium and magnesium salts. Factors essential of control or regulation in the precipitation step for production of the stated desired properties in the precipitate include concentrations and proportions of the precipitants. Subsequent steps disclosed in said copending application comprise filtering, washing and drying of the precipitated material to remove sufficient liquid so that the dried material can be ground, grinding and screening the dried material to desired particle size, preferably percolant size, then subjecting the particles to a cation or base exchange reaction by treating with an aqueous solution containing a magnesium salt, and finally washing and drying the resulting magnesium silicate adsorbent material.

The method of the present invention follows the general procedural steps outlined above and as disclosed in my said copending application, but in addition involves use of explicit control factors in the method, especially as respects treatment of the precipitated material prior to the exchange reaction effective to impart to the precipitated material and to the final exchange magnesium silicate material produced therefrom particular and desired properties and characteristics.

As indicated hereinabove and described in more detail in my said copending application, concentrations of the reactants in the precipitation step are necessarily controlled within certain limits to produce a type of precipitate having sufficient hardness and other properties desired in a percolant type adsorbent. Use of concentrations outside these limits is not satisfactory because they are productive of material too soft to be directly converted to adsorbents of percolant form or material having unsatisfactorily low or no percolant activity. The particular concentration range suitable for production of percolant material depends to some extent upon the reactant materials and certain other precipitation conditions being used, but in any case is of the same order of magnitude. When, for example, a hot solution of high silica sodium silicate such as those having a soda to silica ratio of about 1 to 4 and a substantially equi-molar hot solution of calcium chloride are used as the reactants, the concentration of the solutions (as to $Na_2O$ content in case of the silicate) should be from about 0.08 to about 0.25 molar. In instances where the two reactant solutions are not equimolar this permissible range is widened slightly. Thus, sodium silicate solutions of 0.1, 0.3 and 0.25 molar (as to $Na_2O$) sodium silicate (1 to 4 $Na_2O$ to silica ratio) when reacted hot with calcium chloride solutions of 0.3, 0.1 and 0.3 molar respectively result in calcium silicates of desired properties. Likewise use of mixed metal salts instead of straight calcium salt as one reactant, or use of sodium silicates of relatively low silica content affect the concentration range. Thus, when precipitating from hot solutions using the described sodium silicate of 1 to 4 $Na_2O$ to $SiO_2$ ratio as one reactant and certain mixed magnesium chloride-calcium chloride solutions containing up to about 50 mol per cent $MgCl_2$ as the other, the concentration range for the respective solutions should be from about 0.15 molar to about 0.3 molar, as described in my said copending application, while if the silicate reactant sodium silicates of say 1 to 2.5 $Na_2O$ to $SiO_2$ ratio are used, concentrations of about 0.1 molar up to about 0.4 molar are permissible. Again the concentration range may be affected by the temperature of the reactants. In general, slightly lower concentrations are satisfactory when the precipitation temperatures are relatively low, as for example 25° C., than in cases where hot precipitant solutions are used, as for instance those of 90° C.

The invention is primarily concerned with a regulated or controlled heat treatment of these precipitated metal silicates prior to the exchange reaction and with the effect of this operation upon the characteristics of the resulting products, and includes as particular or special embodiments the method of preparing these metal silicates involving regulated heat treatment thereof and the heat treated materials produced thereby, as well as the magnesium silicate compositions produced therefrom by the exchange reaction.

I have found that conditions employed in this heating step largely influence the degree of activity of the precipitated metal silicate, by which is meant their capacity for subsequent conversion by the exchange reaction to active magnesium silicate compositions of various degrees of adsorbent effectiveness.

As indicated hereinabove, the precipitated metal silicate must be dried to or below a certain maximum total water content. This maximum total water content is in the neighborhood of 70% (as determined by amount of water driven off by heating the dried material at 1000° C. to 1200° C. for two to three hours) in the case of straight calcium silicate precipitates and may vary from this figure for other silicates, but for any particular silicate sufficient water must be removed to produce a material which can be ground or otherwise reduced to desired particle size for use in the exchange reaction in order to obtain percolant form and characteristics in the exchange product. The precipitated material can be brought to this "grindable" condition by drying under various conditions; exposure to temperatures ranging from room temperature up to say 800° C. are effective to remove the required amount of water.

I have discovered according to the present invention that in the removal of the required amount of water, or after required or given amounts of water have been removed, predetermined degrees of activity may be imparted to the precipitated silicates, and consequently various predetermined degrees of adsorbent activity in the final magnesium silicate products produced therefrom can be obtained by suitably regulated or controlled heating of the precipitated material.

In practice of the invention the precipitated, filtered and washed metal silicate is preferably dried and heat-treated in one operation involving both removal of sufficient water to produce a grindable product and production of predetermined activity in the product. The precipitated silicate material apparently passes through several stages when heated. During the early part of the heating period the temperature of the silicate material rises rapidly to a temperature at which free or uncombined water is driven off where it remains for an interval of time. During this interval some activity may be developed in the material; i. e., capacity for conversion to effective magnesium silicate adsorbent compositions by cation or base exchange reaction. Following this interval the temperature of the material rises at a rate depending upon the temperature of the furnace atmosphere, and its activity is increased. Further amounts of water are driven off and apparently a change in chemical or physical structure occurs during this interval of increasing activity. As the heat treatment is further continued the activity of the material reaches a maximum. Continued heat treatment thereafter results in decrease of the activity from the maximum value. As indicated above, sufficient water can be removed from the precipitated silicate material to produce a grindable product by simply exposing the material to the air at room temperature for a relatively long period of time. Material so dried can be converted by the exchange reaction to magnesium silicate compositions having some activity, but heat-treating at elevated temperatures results in much more active products provided the heating conditions are suitably regulated. This is apparently due to more rapid and controlled rate of water removal and/or change to more desirable structure caused by the heat treatment of this invention.

In general the time or heating period required to develop a particular degree of activity depends upon the rate of heating as determined by the furnace characteristics, the amount of material being heated and the temperature of the heating atmosphere. As may be expected, the lower the heating temperature the longer will be the heating period and the higher the heating temperature the shorter the heating period required to develop the desired degree of activity in the precipitated silicate. For example, where the precipitate is exposed to temperatures only as high as 110° C. in the heating step ten or twelve hours of heating may be required to remove sufficient water so that the product can be ground, while an additional three or four hours of heating may be necessary to obtain maximum or peak activity; and still further extension of the heating period may result in decreased activity. On the other hand, in cases where the heating atmosphere reaches high temperatures, these events occur in relatively short times. Thus, in 20 to 30 minutes after placing a given sample of precipitated silicate in a heating atmosphere at 800° C. activity may be developed, and in 45 minutes the peak activity may be reached. Continued heating after 45 minutes will rapidly reduce this activity. Of course the actual heating period to be employed in any particular case to develop desired activity will depend upon the specific heating apparatus used and the amount of material being heated, so that the above stated figures are merely illustrative and do not necessarily apply to all cases.

Likewise, the heat treatment conditions to be employed in specific instances will be determined by the properties desired in the material being heated and in the exchange magnesium silicate adsorbent composition to be produced therefrom. One of the advantages of this invention is that such properties can be to a large extent controlled or predetermined by regulation of heat treating conditions in this step. Furthermore, products having predetermined degree of activity and other properties such as desired density, water content, and the like, can be obtained over a wide range of heat treating temperatures by regulation of heating conditions such as time or period of heating, thus making for a flexible method adaptable to various needs and apparatus.

These advantages are in large part made possible by the fact that for a given activating temperature condition there are heating periods or heating rates which will impart various physical properties to the products, and desired activities ranging up to the peak or maximum under such temperature condition.

Where time is not a major consideration low temperature heat treatment requiring no high temperature apparatus may be used to advantage, as for example heat treatments in which the silicate is heated in atmospheres of 85° C. (at subatmospheric pressure) to 120° C. Under the latter temperature conditions the heating period required to develop the required activity though relatively long is also relatively easy to control in preventing overheating. On the other hand, where time is a major economic factor high temperature heat treatment may be used to produce in most cases equally good results in relatively short periods; heat treatments in which the silicate is heated in atmospheres reaching 700° C. to 800° C. or even higher may develop desired activity in the matter of minutes or at most a few hours, but in such cases more careful regulation or control must be observed in order to prevent overheating and destruction of activity. Overheating apparently causes surface destruction or general change to an undesirable structure.

It should be apparent from the preceding discussion that the invention provides a method whereby with a given furnace or heating apparatus products of predetermined or desired properties may be obtained by heating under controlled or regulated temperature and time conditions, and that for a given temperature condition the heating period or heating rate may be regulated to produce as desired metal silicate materials having activities ranging up to a peak or maximum obtainable under such temperature condition.

I have further discovered, in accordance with the present invention, that the stated peak activities obtained under the various temperature conditions are highest when said temperature conditions are within a certain range. The peak activities obtained within said range of temperature conditions will be herein termed "optimum activity." Optimum activity is obtained by heating the metal silicates for suitably regulated periods in atmospheres reaching but not exceeding temperatures within said range during the heat treatment. This temperature range is generally intermediate. For example, optimum activities were obtained in heat treatments of small batches of precipitated calcium silicate for suitable periods in laboratory muffle furnaces in which the heating atmosphere reached a maximum temperature during the treatment within the range of from about 300° C. to about 600° C. Operation under such intermediate temperature conditions has the additional advantages of relative ease of control in preventing overheating and obtainment of desired activity in a heating period not unreasonably long. Also, special apparatus designed to withstand extremely high temperature operation is unnecessary.

The product resulting from the heat treatment is a hard granular material of variable particle size, depending upon the state of physical subdivision of the filter-cake when placed in the furnace, and does not break down to a powder when subjected to the grinding operation. This material is then ground to desired particle size in a suitable grinding apparatus. Preferably the mass is ground and screened to percolant adsorbent particle size, as for example 30–60 mesh, in order that the final product from the exchange reaction to follow will be of percolant sized particles.

Instead of the above procedure the precipitated silicate from the filters or washers may be subjected to a preliminary drying operation to remove a portion of the water to permit of easier handling and then activated by heat treatment. For example, one specific embodiment comprises drying the precipitate to a grindable state, grinding to percolant size and subjecting the percolant sized particles to the activating heat treatment.

The particles of heat treated metal silicate which, as stated hereinabove, may contain calcium, strontium, barium or other metal exchangeable with magnesium ions to produce an active adsorbent and in addition to these metals may also contain magnesium, is then subjected to cation or base exchange by treatment with an aqueous solution containing magnesium ions, as for example a magnesium chloride solution. Mixed chloride or equivalently useful soluble salt solutions may be used to advantage provided sufficient magnesium ions are present to replace calcium ions or other exchangeable metal ions in the solid silicate with which the exchange reaction is effected. For example, aqueous exchange solutions containing both magnesium and calcium chlorides such as certain brines may be used to advantage. Use of sulfates in the treating solution is permissible for although insoluble sulfates are formed in the reaction in such cases, they are formed as very fine particles which are readily separated from the coarse exchange magnesium silicate particles by any method taking advantage of difference in particle size.

In general, the treating solutions used and the manner of conducting the exchange reaction are the same as described in my copending application Serial No. 419,109. The exchange reaction may be conducted as a one stage batch operation, or in a plurality of batch stages using fresh treating solution for each stage, or a continuous or countercurrent or semi-countercurrent operation may be used. Likewise the reaction may be conducted by flowing the treating solution through a static bed of the solid particles of metal silicate. Treating solutions of various concentrations are satisfactory; for example, good results are obtained when using magnesium chloride solutions of 0.15 molar to 1.0 molar concentrations as respects magnesium chloride. The treating solution is preferably used hot; for example, about 90° C.

The exchange magnesium silicate is then filtered and washed if desired to remove treating solution. The resulting mass which resembles wet sand is then dried by heating to a suitable temperature not destructive to the percolant adsorbent properties thereof. Prolonged drying at temperatures above 700° C. is destructive in this respect and should be avoided.

The dried product is a mass of free-flowing particles of sizes depending upon the particle sizes of the silicate employed in this exchange reaction. If the latter was of percolant size, the particles of exchange magnesium silicate will also be of percolant size requiring no grinding prior to use.

The following examples and experimental data will serve to illustrate the invention as regards use of control factors such as time, temperature and rate of heating in drying laboratory batches of particular precipitated silicates in specific equipment and the effect thereof on activity of the final exchange magnesium silicate. It will be realized that production on a larger scale or by different modes of heating may entail some variation of stated control factors and their relation to one another, and such is included in this invention.

The precipitated silicates employed in the examples were calcium silicates produced by adding to a sodium silicate (ratio of $Na_2O$ to $SiO_2$= 1:4) solution of 0.15 molar concentration as to $Na_2O$ contained therein, a 0.15 molar solution of calcium chloride, both solutions being at about 90° C., agitating and maintaining the reaction mixture at about 90° C. until precipitation is complete, filtering and washing the precipitate on a Büchner funnel.

The furnace used for the heat treatment was an ordinary laboratory muffle furnace.

The heat treatment comprised heating the furnace to a predetermined initial temperature as measured by thermocouples placed in the heating atmosphere therein, placing therein about 300 grams of the filtered and washed precipitate prepared as above and heating for a suitable period of time. The filter-cake, prior to heating was broken into lumps so as to form a layer in the heating atmosphere.

Subsequent treatment of the heat treated precipitated silicate consisted in grinding and screening the dried material to a 30–60 mesh particle size, slurrying the resulting particles with 0.5 molar magnesium chloride solution at about 90° C. for 1 hour with mild agitation, removing treating solution and repeating the slurrying operation using fresh 0.5 molar magnesium chloride solution, then filtering, washing and drying the resulting particles at 560° C. for 1 hour. The dried exchange magnesium silicate was then screened to 30–60 mesh particle size and the particles of 30–60 mesh size were tested for oil-decolorizing effectiveness as percolant adsorbents for oil filtration. The oil used in the test was an undecolorized, undewaxed Pennsylvania lubricating oil stock of 26.1 gravity, 50° F. pour point, 550° F. flash (closed cup) and 147 seconds Saybolt viscosity at 210° F. Said oil had an optical density color value of 2620 O. D. as measured by the method of Ferris and McIlvain as described in Industrial and Engineering Chemistry, Analytical Edition 6, 23 (1934), except that a Bausch and Lomb monochromatic green filter was used as the source of monochromatic light. This oil was first diluted with decolorized Stoddard's solvent to give a solution of 40% oil and 60% Stoddard's solvent by volume. The oil solution was then run slowly through a bed of the adsorbent. The bed consisted of 100 c. c. of adsorbent (measured without tapping), the bed being 21 inches deep. The adsorbent was maintained at approximately 135° F. during filtration of the oil therethrough. When the oil in all of the oil solution which had passed through the filter had reached a color corresponding to a 7 A. S. T. M. color as determined by comparisons with samples of known color, the run was considered complete. The run required about 4 hours' time.

From the volume of oil filtered and the volume of adsorbent used in the test the volume ratio was computed. Volume ratio is the ratio of the volume of decolorized oil, exclusive of the solvent, to the volume of adsorbent used.

*Example 1*

300 grams of the filter-cake of the described calcium silicate produced by the above stated precipitation method were placed in the form of lumps in a layer in the described muffle furnace, the atmosphere in which was at an initial temperature of 400° C. A thermocouple was imbedded in the silicate material. The silicate material was heated in the furnace for 5 hours, and during this period the temperatures of the heating atmosphere and of the silicate material at specific times were as follows:

| Time | Temperature | |
|---|---|---|
| | Atmosphere | Material |
| | °C. | °C. |
| After 1 hour | 240 | 100 |
| After 1½ hours | 245 | 105 |
| After 2 hours | 275 | 160 |
| After 2½ hours | 315 | 270 |
| After 3 hours | 350 | 315 |
| After 3½ hours | 375 | 340 |
| After 4 hours | 390 | 355 |
| After 4½ hours | 395 | 365 |
| After 5 hours | 400 | 370 |

Exchange magnesium silicate compositions prepared as described above from the calcium silicate which had been heated as in Example I showed a percolant decolorizing activity equivalent to 2.9 volume ratio by the described test. In other runs in which samples of the silicate were heat-treated as in Example I using an initial furnace atmosphere temperature of 400° C. and heating periods of 3 hours, 20 hours and 48 hours, the percolant decolorizing activities of the magnesium silicate composition produced from the heat-treated silicates were 2.4, 2.4 and 1.4 volume ratios respectively. In these runs the temperatures of both heating atmosphere and material were at about 400° C. at the 20 and 48 hour points.

*Example II*

In this instance the muffle furnace was initially heated to 500° C. Another sample of 300 grams of the described calcium silicate precipitate was placed therein and heated for 3 hours. The temperature conditions of heating atmosphere and material during the heat treatment were as follows:

| Time | Temperature | |
|---|---|---|
| | Atmosphere | Material |
| | °C. | °C. |
| After ½ hour | 290 | 100 |
| After 1 hour | 290 | 120 |
| After 1½ hours | 320 | 245 |
| After 2 hours | 375 | 365 |
| After 2½ hours | 425 | 410 |
| After 3 hours | 450 | 440 |

Exchange magnesium silicate composition produced as described from the heat-treated calcium silicate of Example II showed a percolant decolorizing activity of 2.9 by the described test. In similar tests the calcium silicate was heated in an atmosphere initially at 500° C. for 1, 2 and 5.5 hours. Magnesium silicate adsorbent compositions produced from these heat-treated silicates tested to percolant adsorbent power of 2.1, 2.6 and 2.5 volume ratio respectively. At the 5.5 hour point temperatures of material and heating atmosphere were at about 500° C.

*Example III*

Another 300 gram sample of the described calcium silicate was placed in the muffle furnace having an initial temperature of 550° C. The material was heated for 2½ hours. The temperature-time relations were as follows:

| Time | Temperature | |
|---|---|---|
| | Atmosphere | Material |
| | °C. | °C. |
| After ½ hour | 325 | 100 |
| After 1 hour | 345 | 200 |
| After 1½ hours | 410 | 375 |
| After 2 hours | 485 | 465 |
| After 2½ hours | 510 | 490 |

The exchange magnesium silicate composition produced as described from the heat-treated silicate in this instance tested to 2.9 volume ratio by the described test.

In similar tests, the initial heating atmosphere was 550° C. and the heating periods used were 1, 2 and 10 hours. Magnesium silicate adsorbent compositions produced from these heat-treated calcium silicates tested 2.5, 2.6 and 2.6 volume ratios respectively. At the end of the 10 hour period the temperatures of both material and heating atmosphere were about 550° C.

*Example IV*

Other 300 gram samples of the described calcium silicate precipitate were heat-treated in the same or similar muffle furnace described in Example I, except where temperatures not exceeding 120° C. were used, in which cases an ordinary laboratory electrically heated drying oven was employed. In these instances as in those of Examples I to III the temperatures of the heating atmosphere never exceeded the initial temperature. The results of these tests are shown in the following table. In each instance the heat-treated silicate material was converted to exchange magnesium silicate composition in the same manner as described above and tested for decolorizing power by the above described test.

| Initial heating atmosphere temp., °C. | Heating period, hours | Decolorizing power of exchange magnesium silicate, volume ratio |
|---|---|---|
| 110 | 14 | 2.2 |
| 110 | 20 | 2.1 |
| 120 | 19 | 2.7 |
| 120 | 32 | 2.4 |
| 200 | 5 | 2.5 |
| 200 | 18.5 | 2.7 |
| 300 | 23 | 2.8 |
| 300 | 72 | 2.0 |
| 600 | 1 | 2.4 |
| 600 | 1.5 | 2.7 |
| 600 | 2 | 2.8 |
| 600 | 2.5 | 2.8 |
| 800 | 0.5 | 2.3 |
| 800 | 0.75 | 2.7 |
| 800 | 1 | 1.9 |
| 800 | 1.5 | 1.6 |

The examples appearing above and the tabulated data illustrate the results obtained by use of various heating conditions employed in practice of the invention. As can be seen, when heat treating under a given heating condition indicated by initial temperature of the heating atmosphere, the activity of the material increases to a maximum and then falls off as the heating period is continued at a rate depending upon the temperature conditions. At an initial temperature of 800° C. the periods required for occurrence of these events is much less than at lower temperatures, as for example 120° C. or 110° C. Also apparent from the above examples and data is the fact that optimum activities (2.8–2.9 volume ratios) are obtained in the runs in which the initial heating atmosphere temperatures of from about 300° C. to about 600° C. were used and in which the temperatures of the heating atmospheres did not exceed this range during heat treatment. These activities are very high when it is considered that the decolorizing power of a widely used percolant adsorbent used for percolation decolorization of lubricating oils tested only 1.6 volume ratio by the same test.

While in the above description and discussion emphasis has been placed upon obtainment of peak activities and optimum activities in the heat-treated metal silicate material and corresponding peak adsorbent power and optimum adsorbent power in the exchange magnesium silicate compositions produced therefrom, it will be understood that the method of the invention is not limited to use of conditions producing these results, but is broadly concerned with controlled heat treatment to produce useful products of any desired activity whether of peak or optimum or less degree.

Likewise, of course, the invention is not to be considered limited to use in the heating step to the particular heating furnace or apparatus described herein or specific heating procedure shown. Instead of the described procedure the precipitated metal silicate material may be passed through a furnace or other suitable heating equipment while the heating atmosphere remains static or is moved in the same or counter-current direction, the temperature conditions and heating periods being suitably regulated to produce activated products within the scope and meaning of this invention.

I claim:

1. A magnesium silicate composition having adsorbent properties produced by precipitating a calcium-containing silicate by reacting in aqueous solution an alkali metal silicate of a concentration of from about 0.08 to about 0.4 molar based on the alkali metal oxide therein and a calcium salt of a concentration of from about 0.08 to about 0.4 molar, drying said calcium-containing silicate by heating and then treating the dried material with an aqueous solution containing magnesium ions to exchange calcium ions of said calcium-containing silicate with magnesium ions said drying of the calcium-containing silicate being conducted in an atmosphere of a temperature between about 300° C. and about 600° C.

2. Method for preparing magnesium silicate adsorbent compositions adapted for use in percolation decolorizing methods comprising reacting in aqueous solution a soluble silicate and a salt of an alkaline earth metal replaceable in cation or base exchange reaction by magnesium, to produce a precipitated alkaline earth metal silicate having desired properties, drying the precipitate in an atmosphere of a temperature of from about 300° C. to about 600° C. to produce a hard mass which can be reduced to discrete solid particles, reducing said mass to desired particle size and treating the resulting particles with an aqueous solution containing magnesium ions to exchange alkaline earth metal ions of said alkaline earth metal silicate with magnesium ions.

3. Method for producing a magnesium silicate composition effective as an adsorbent in percolation filtration of lubricating oils which comprises precipitating a calcium silicate from aqueous solution, filtering and drying the precipitate in an atmosphere of a temperature from about 300° C. to about 600° C. to produce a dried filter cake, said precipitation being conducted under conditions effective to produce in the dried filter cake a hard granular structure, subsequently reducing the dried filter cake to desired particle size and treating the resulting calcium silicate particles with a magnesium salt solution to exchange calcium ions with magnesium ions.

4. Method for preparing magnesium silicate adsorbent compositions adapted for use in percolation decolorizing methods comprising reacting a suitable aqueous solution containing a dissolved alkali metal silicate with a suitable aqueous solution containing a calcium salt to produce a precipitate of calcium-containing silicate convertible to active magnesium silicate by exchange reaction, drying said precipitate to a hard mass by heating in an atmosphere of a temperature of from about 300° C. to about 600° C., reducing said hard mass to percolant sized particles, treating said particles with a solution containing magnesium ions to exchange calcium ions of the calcium-containing silicate with magnesium ions and produce exchange magnesium silicate material, and drying the exchange magnesium silicate material.

5. Method for preparing magnesium silicate adsorbent composition adapted for use in percolation decolorizing methods comprising reacting a hot aqueous solution containing sodium silicate and a hot aqueous solution containing calcium chloride to produce a precipitate of calcium-containing silicate having desired properties, filtering, washing and drying said calcium-containing silicate by heating the same in an atmosphere of a temperature of from about 300° C. to about 600° C. to produce a mass which can be reduced to desired particle size, reducing said mass to desired particle size, treating the resulting particles with an aqueous solution containing magnesium ions to exchange calcium ions of the calcium-containing silicate with magnesium ions and produce particles of magnesium silicate, and drying the resulting particles.

CHAS. C. WINDING.